United States Patent
Ambrosini et al.

(10) Patent No.: US 6,609,121 B1
(45) Date of Patent: Aug. 19, 2003

(54) LIGHTWEIGHT DIRECTORY ACCESS PROTOCOL INTERFACE TO DIRECTORY ASSISTANCE SYSTEMS

(75) Inventors: Martin A. Ambrosini, Coral Springs, FL (US); Edward E. Huth, Boca Raton, FL (US); Victor S. Moore, Boynton Beach, FL (US); Wendi L. Nusbickel, Boca Raton, FL (US); Brian E. Yoder, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 09/617,560

(22) Filed: Jul. 17, 2000

(51) Int. Cl.⁷ .............................. G06F 17/30
(52) U.S. Cl. ................. 707/3; 707/10; 707/101; 709/218
(58) Field of Search ............... 707/2, 3, 5, 10, 707/101, 103 R, 104.1, 4; 709/217, 218, 219; 455/414, 445

(56) References Cited

U.S. PATENT DOCUMENTS

| | | | | |
|---|---|---|---|---|
| 6,052,681 A | * | 4/2000 | Harvey | 707/3 |
| 6,085,188 A | * | 7/2000 | Bachmann et al. | 707/3 |
| 6,161,008 A | * | 12/2000 | Lee et al. | 455/414 |
| 6,347,312 B1 | * | 2/2002 | Byrne et al. | 707/3 |
| 6,356,892 B1 | * | 3/2002 | Corn et al. | 707/3 |
| 6,366,913 B1 | * | 4/2002 | Fitler et al. | 707/9 |

OTHER PUBLICATIONS

Law, K.L. Eddie, "XML on LDAP Network Database", IEEE Canadian Conference on Electrical and Computer Engineering, Mar. 7–10, 2000, vol. 1, pp. 469–473.*

W. Yeong, et al., *Lightweight Directory Access Protocol*, (Mar. 1995) <http://www.ietf.org/rfc/rfc1777.txt?number=1777>.

* cited by examiner

*Primary Examiner*—Shahid Alam
(74) *Attorney, Agent, or Firm*—Akerman Senterfitt (57) ABSTRACT

A method for mapping a Lightweight Directory Access Protocol (LDAP) interface to a Directory Assistance (DA) system can comprise the following steps. First, LDAP compatible search arguments for searching an LDAP database can be extracted from an LDAP request. Second, the LDAP compatible search arguments can be converted to search arguments compatible with a DA system database. Third, the DA system database can be queried using the converted search arguments. Fourth, a result set of listings from the DA system database can be received in response to the query. Finally, the result set can be converted to a result set compatible with LDAP. Preferably, each of the five steps can be performed in a plug-in to the LDAP server. Additionally, the method can include the step of receiving the LDAP request from an LDAP client. Moreover, the method can include the step of receiving the LDAP request in an LDAP server.

15 Claims, 4 Drawing Sheets

LIGHTWEIGHT DIRECTORY ACCESS PROTOCOL INTERFACE TO DIRECTORY ASSISTANCE SYSTEMS

BACKGROUND OF THE INVENTION

1. Technical Field

This invention relates to the field of network directory services and more particularly to a system and method for interfacing a directory assistance system with a tree-based Lightweight Directory Access Protocol (LDAP) interface.

2. Description of the Related Art

A directory is a mechanism that clients can use to locate entries and attributes about those entries. Clients are often people (for example, someone "querying the directory"), but could also be programs (for instance, an application looking up an attribute about a user). Entries might include network resources such as printers or web pages or people (a "white pages" directory). In addition to the clients and entries, the type of query being used to access the information is also important. The query structure defines the semantics of retrieving information from the directory. Different combinations of client type, entry type, and query type result in different kinds of directory applications. In sum, directories can be thought of as databases with the important characteristic that the number of database read operations generally exceeds the number of write operations by at least an order of magnitude. In addition, directory servers can be defined as repositories of attribute/value pairs that clients can use to locate entries and attributes using structured queries.

Directory Assistance (DA) solutions incorporate directories and directory servers which can provide phone numbers stored in the directories to callers via an operator service center. Typically, a caller dials "information" (e.g. "411") to get the phone number of a person or business. Subsequently, the DA system employs an indexed referencing mechanism to obtain the requested information. Present DA systems have a proprietary interface for accessing information contained therein.

Each DA system typically organizes data stored therein differently from other data stored in other DA systems. Yet, presently, there exists a business need for customers of DA systems, for instance telecommunications companies, to share or even sell access to the disparately organized information stored in each DA system. Notwithstanding, the problem of sharing or selling access to customer DA system data has not been solved in both a standard manner and in an open systems environment.

Currently communication mechanisms between different DA systems and different installations of the same DA system have been implemented in closed, controlled environments. For instance, a customized Internet program in combination with hypertext markup language (HTML) pages have been provided to users in order to grant Intranet access to a proprietary DA system positioned behind a firewall. However, no solution has been devised that provides for an open standard for facilitating data interchange between disparate DA systems, which does not require specially written applications or programmer support in order to implement.

Moreover, current DA systems utilize proprietary interfaces which cannot be easily externalized directly to outside applications. Specifically, providing external access to a DA system implicates security concerns as well as training issues with the interface itself. For example, exposing the proprietary interface of a DA system can require the creation of a security mechanism to control access to the system. Moreover, exposing the proprietary interface of a DA system can require the training of users in the use of the DA system. Notably, training can further implicate the creation of documentation and the assembly of a support team. The training can be required because the proprietary interface to the DA system is not always intuitive. In consequence, users of the system must understand the proprietary nature of the underlying information stored in the DA system in order to use it. Finally, providing external access to a DA system can create a migration problem for users migrating from a proprietary DA system. In particular, applications designed to interact with the proprietary interface to the DA system can be compromised when transitioning to a different DA system or a different interface to the DA system.

Unlike the proprietary interfaces of current DA systems, the lightweight directory access protocol (LDAP) is an open industry standard directory services protocol which can provide a consistent and controlled system for accessing data. LDAP represents a simple, albeit powerful directory service which is capable of performing powerful directory service queries as well as allowing clients to issue commands that add, delete or modify directory service entries. Although the underlying storage of the information between LDAP servers can be disparate, the LDAP protocol does not expose this disparity to users of an LDAP interface. In LDAP, the basic unit of information consists of an entry. Entries are stored in directories. Directory entries are arranged in a hierarchical tree-like structure that can reflect real-world boundaries, for example a location or organization. The hierarchical tree-like LDAP structure enables users of a directory service to navigate through information stored therein in a known manner. Furthermore, through standard interfaces, the schema or organization of the attributes in an LDAP directory are obtainable. Consequently, LDAP applications, for example LDAP enabled web browsers like Netscape Communicator or Microsoft Internet Explorer, can use an LDAP directory interface without requiring of its users special training or knowledge of the underlying information system.

LDAP, a simplification of the X.500 directory access protocol (DAP), is defined in the request for comment, RFC-1777, "Lightweight Directory Access Protocol", available from the Internic HTTP server having the fully-qualified URL: ds.internic.net/rfc/rfc1777.txt and incorporated herein by reference. Specifically, LDAP defines a reasonably simple mechanism for Internet clients to query and manage an arbitrary database of hierarchical attribute/value pairs over a TCP/IP connection using port 389.

The LDAP directory service model is based on entries. An entry is a collection of filter attributes that has a name, referred to as a distinguished name (DN). The DN can be used to refer to the entry unambiguously. Each of the entry's attributes can have a type and one or more values. The types typically are mnemonic strings, for example "cn" for common name, or "mail" for e-mail address. The values can depend on the type of corresponding attribute. For example, a mail attribute may contain the value "johnd@xyz.com". Similarly, a jpeg photo attribute may contain a photograph in binary JPEG format. An entry's DN can be constructed by taking the name of the entry itself, referred to as the relative distinguished name (RDN), and concatenating the names of the RDN's ancestor entries. For example, the entry for John Doe can have an RDN of "cn=John Doe" and a DN of "cn=John Doe, o=xyz, c=US".

In LDAP, directory entries are arranged in a hierarchical tree-like structure that reflects political, geographic, and/or organizational boundaries. Entries representing countries can appear at the top of the tree. Below the country entries are entries representing states or national organizations. Below the state or national organization entries can exist entries representing people, organizational units, printers, documents, or other catagorizational sub-units. Notably, the hierarchy in LDAP is a hierarchy of entries within a database, not a hierarchy of server connections, or other network configuration information.

LDAP entries generally are typed by an objectclass attribute. For example, in order to restrict searches of a directory to entries exclusively including access control lists, the search phrase "objectclass=acl" can be specified so that only entries purporting to be access control lists are located. LDAP permits a user to control which attributes are required and allowed for a particular object class, thus determining the schema rules that the entry must obey. The choice of attribute names and the hierarchical structure of LDAP are derived from LDAP's X.500 roots. However, it is important to note that LDAP is not an X.500 directory. Rather, it is the protocol between parties transacting business relating to any hierarchical, attribute-based directory. In the degenerate case, the hierarchy can be a single level and the attributes could be arbitrarily proprietary.

LDAP defines operations for interrogating and updating the directory. Furthermore, LDAP provides operations for adding and deleting an entry from the directory, changing an existing entry, and changing the name of an entry. Still, the primary operation of LDAP is to search for information stored in the directory. Consequently, the LDAP search operation allows some portion of the directory to be searched for entries that match some criteria specified by a search filter. A client can request information from each entry that matches the criteria. For example, a user can search the entire directory subtree below XYZ Corporation for people with the name John Doe, retrieving the e-mail address of each entry found. Alternatively, LDAP permits a user to search the entries directly below the entry for United States (c=US) for organizations containing the string "Acme" in the organization name, which organizations further have a fax number. RFC-1558, "A String Representation of LDAP Search Filters," available from the Internic HTTP server having the fully-qualified URL: ds.internic.net/rfc/rfc1558.txt and incorporated herein by reference, specifies the syntax for the filters that can define a search. Using the searching facility, client developers can easily provide powerful search capabilities.

In performing a directory query, LDAP clients can choose filter attributes in the directory tree, for example a search location, and filter the search therefrom. Sample "base" values can include "st=FL . . . c=us" or "l=Boca Raton, l=Highland Beach Directory, st=FL, . . . , c=us". Additionally, an LDAP search can begin from almost any node in the LDAP directory tree. The LDAP client merely can set the search base to determine the point in the tree to begin the search. Advantageously, an LDAP search can return a result set with respect to each matching entry's location in the LDAP directory tree. The result set can be communicated to an LDAP client using an LDAP distinguished name (DN) which indicates to the LDAP client the path to the LDAP directory entry, for example "dn: cn=John Doe, l=Boca Raton, l=Highland Beach Directory, st=FL, . . . , c=us". In this example, "John Doe" is located in the city of "Boca Raton", in the directory of "Highland Beach", in the state of "FL", and a country "US".

The LDAP directory service is based on a client-server model. Specifically, one or more LDAP servers contains the data comprising the LDAP directory tree. An LDAP client can connect to an LDAP server and transmit a request for data. The server either can respond with the data, or if the data is not available locally, the server can attempt to connect to another server, typically another LDAP server, that can fulfill the request. LDAP uses this referral capability to implement cooperating communities of disjoint LDAP servers, and to force all database changes to be referred to certain master LDAP servers. Notably, when LDAP servers employ the same naming convention, no matter which LDAP server a client connects to, the connecting client sees the same view of the directory. That is, a name presented to one LDAP server references the same entry that it would at another LDAP server.

At the lowest level, any client requiring access to directory information connect to an LDAP server over a TCP/IP connection. Subsequently, the client can transmit LDAP commands to the LDAP server over the TCP/IP connection. Notably, to transmit an LDAP command, only a Domain Name System (DNS) name or explicit Internet protocol address for the LDAP server and a port number, for example port 389, are required. Upon receiving the transmitted LDAP command, the LDAP server can process the LDAP command and, if possible, reply with directory information. Hence, to command an LDAP server having the URL directory.xyz.com, a client could specify in an LDAP client, "ldap://directory.xyz.com/<LDAP command>" where ldap: invokes port 389, directory.xyz.com is a valid DNS name and <LDAP command> is a LDAP protocol command issued to the LDAP server by the LDAP client.

The following source code written in the "C" programming language illustrates an example method for issuing an LDAP command from a client to an LDAP server and receiving from the LDAP server responsive directory information:

```
main()
{
    LDAP *ld;
    LDAPMessage *res, *e;
    int i;
    char *a, *dn;
    void *ptr;
    char **vals;
    /* open a connection */
    if ( (ld = ldap_open( "dotted.host.name",LDAP_PORT )) == NULL ) exit( 1 );
    /* authenticate as nobody */
    if ( ldap_simple_bind_s( ld, NULL, NULL ) != LDAP_SUCCESS )
    {
```

```
        ldap_perror( ld, "ldap_simple_bind_s");
        exit( 1 );
    }
    /* search for entries with cn of "John Doe", return all attributes */
    if ( ldap_search_s( ld, "o=myorganization, c=US", LDAP_SCOPE_SUBTREE,
            "(cn=John Doe)", NULL, 0, &res ) != LDAP_SUCCESS)
    {
        ldap_perror( ld, "ldap_search_s" );
        exit( 1 );
    }
    /* step through each entry returned */
    for ( e = ldap_first_entry( ld, res ); e != NULL; e = ldap_next_entry( ld, e) )
    {
        /* print its name */
        dn = ldap_get_dn( ld, e);
        printf( "dn: %s0, dn );
        free( dn );
        /* print each attribute */
        for ( a = ldap_first_attribute( ld, e, &ptr ); a != NULL;
            a = ldap_next_attribute( ld, e, ptr ) )
        {
            printf( "attribute: %s0, a );
            /* print each value */
            vals = ldap_get_values( ld, e, a );
            for ( i = 0; vals[i] != NULL; i++ )
            {
                printf( "value: %s0, vals[i] );
            }
            ldap_value_free( vals );
        }
    }
    /* free the search results */
    ldap_msgfree( res );
    /* close and free connection resources */
    ldap_unbind( id );
}
```

LDAPv3.1 provides a "plug-in" architecture which permits a third party provider to integrate services into an LDAP server and consequently obtain processing control when a user of the host LDAP server specifies the node of the plug-in in the LDAP tree. An LDAP server plug-in is a shared object or library containing functions external to the functions provided with the LDAP server. Plug-in functions can be written to perform the following tasks: Validating data before the server performs an LDAP operation on the data; performing some user-defined action after the server completes an LDAP operation; and, performing extended operations; providing alternate matching rules when comparing certain attribute values. In the present invention, the LDAP plug-in is used to replace an existing back-end database with the database of a proprietary DA system.

When employing an LDAP server plug-in, on startup, the LDAP server can load the specified shared object or library and can call the plug-in functions stored therein during the course of processing various LDAP requests. Notably, the LDAP server can invoke a plug-in function at several points in the process of servicing an LDAP request. For example, the LDAP server can call the LDAP server plug-in functions before executing an LDAP operation; when the LDAP server is to add, modify, delete, or find entries in the database; before writing an entry to the database; after reading an entry from the database; after executing an LDAP operation; when an LDAP request contains an extended operation; when the LDAP server indexes an attribute; and, when an LDAP server filters candidates for search results based on an attribute. In the present invention, the plug-in function can be called during the execution of an LDAP operation.

In most cases, when the LDAP server calls an LDAP server plug-in function, the LDAP server passes a parameter block to the plug-in function. The parameter block can contain data relevant to the operation performed by the plug-in function. For example, in an LDAP add operation, the parameter block can contain the entry to be added to the directory and the DN of that entry. As a result, the server plug-in function can access and modify data in the parameter block. Further, if the LDAP server plug-in function is invoked before an LDAP operation executes, the plug-in function can prevent the LDAP operation from executing. For example, a plug-in function can validate data before a new entry is added to the directory. If the data is invalid, the plug-in function can abort the LDAP add operation and return an error message to the LDAP client.

Still, LDAP has not been integrated with current DA systems. In fact, the integration of LDAP with existing DA systems could prove problematic, particularly where the data in the DA system is structured in a manner incompatible with the hierarchical tree-like structure of traditional LDAP-compliant systems. Hence, there remains a need not only for a method and system for attaching the LDAP protocol onto existing DA systems, but also for a method of abstracting the underlying DA system so that the data contained therein appears to be structurally organized in a typical LDAP hierarchical tree-like directory structure.

SUMMARY OF THE INVENTION

Large scale Directory Assistance (DA) systems use proprietary database structures having proprietary access in order to minimize access times and all scaling to millions of directory listings. However, the modern trend of open, standards-based access to directory information, exemplified by the Lightweight Directory Access Protocol (LDAP) compel operators of proprietary DA systems to deploy parallel systems that can be costly to implement and maintain. A system and method in accordance with the inventive arrangements permits operators of proprietary DA systems to implement and maintain a single DA system which, in consequence of the present invention, can support multiple access types.

A method for mapping a Lightweight Directory Access Protocol (LDAP) interface to a Directory Assistance (DA) system can comprise the following steps. First, LDAP compatible search arguments for searching an LDAP database can be extracted from an LDAP request. Second, the LDAP compatible search arguments can be converted to search arguments compatible with a DA system database. Third, the DA system database can be queried using the converted search arguments. Fourth, a result set of listings from the DA system database can be received in response to the query. Finally, the result set can be converted to a result set compatible with LDAP. Preferably, each of the five steps can be performed in a plug-in to the LDAP server. Additionally, the method can include the step of receiving the LDAP request from an LDAP client. Moreover, the method can include the step of receiving the LDAP request in an LDAP server.

In the preferred embodiment, the LDAP request is an LDAP filtered attribute. Consequently, in the preferred embodiment, the step of converting can include the step of mapping search arguments in the filtered attribute to search arguments compatible with the DA system database. Notably, the mapping step can comprise consulting a locality resolution database, each record in the locality resolution database mapping a locality to a locality ID set, identifying in the locality resolution a database record corresponding to the search arguments; and, forming a DA system database query statement with a locality ID set contained in the identified record. Furthermore, the locality ID set can include at least one of an area code, book and location.

A system for mapping a Lightweight Directory Access Protocol (LDAP) interface to a Directory Assistance (DA) system can include the following components: an LDAP client for transmitting LDAP requests for directory information; an LDAP server for receiving and processing the LDAP requests; a DA system for providing directory information responsive to DA system compatible requests for the DA system directory information, the DA system directory information stored in a DA system database; and, a plug-in coupled to the LDAP server. Significantly, the plug-in can intercept the LDAP requests, extracting therefrom LDAP compatible search arguments for searching an LDAP database, and convert the LDAP compatible search arguments to search arguments compatible with the DA system database. Additionally, the plug-in can query the DA system with the converted search arguments, receive a result set of listings therefrom in response to the query, convert the result set to a result set compatible with LDAP, and pass the LDAP compatible result set to the LDAP server. Finally, the LDAP server can provide the LDAP compatible result set to the LDAP client.

In the preferred embodiment, the LDAP request is an LDAP compatible search. Preferably, the plug-in can convert the LDAP compatible search arguments to search arguments compatible with the DA system database by mapping search arguments in the filtered attribute to search arguments compatible with the DA system database. As such, the system can further include a locality resolution database wherein the mapping is determined by the locality resolution database, each record in the locality resolution database mapping a locality to a locality ID set. Furthermore, the locality ID set comprises at least one of an area code, book and location.

The system can further include a file update program for loading locality and directory information in the DA system database and a locality processor for producing a load file based on the locality information. Notably, the load file can interface the locality resolution database with the plug-in. Furthermore, the load file can further interface an LDAP database with the plug-in.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

A Lightweight Directory Access Protocol (LDAP) interface to a Directory Assistance (DA) system can provide a layer of software integrated into an LDAP server which can map the LDAP schema to and from a proprietary DA system. Specifically, the LDAP interface can map the data contained in the DA system into an LDAP schema, even though the DA system data itself is not organized into an LDAP tree-like structure. In consequence, clients can access the DA system using a standard LDAP interface without exposing the proprietary nature of the information or compromising the security of the DA data.

Figure 1:
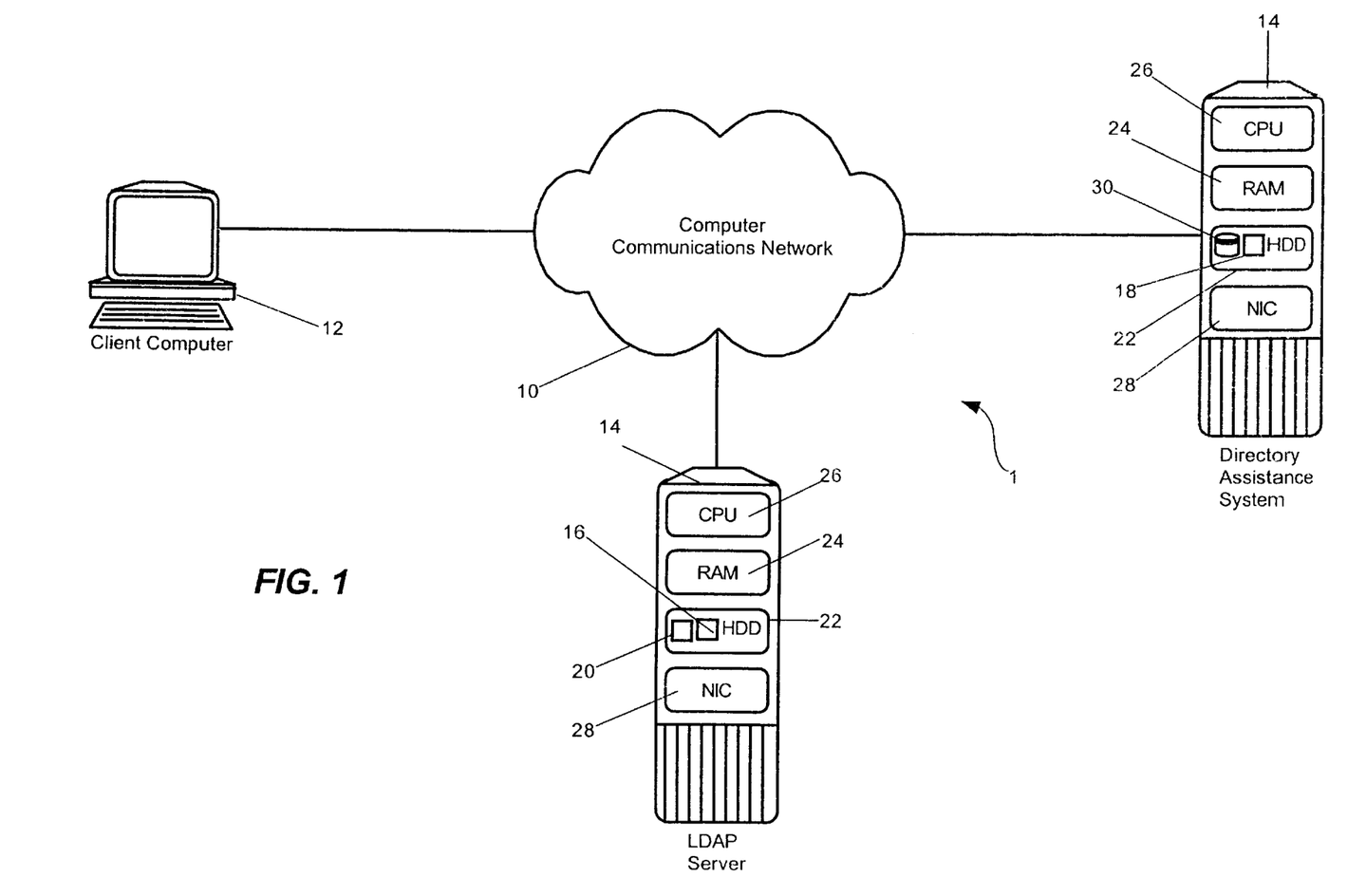
FIG. 1 is a schematic representation of a computer communications network linking a Directory Assistance (DA) system, an LDAP server and an LDAP client.

FIG. 1 illustrates a typical network environment 1 in which an LDAP interface to a DA system 20 can operate. This network environment 1 comprises a computer communications network 10 interconnecting client computers 12 and servers 14 where the servers include at least one LDAP server application 16 and at least one DA system application 18, although only a single client 12, single LDAP server 16 and a single DA system 18 are shown in the figure for ease of illustration. Typically, however, the network environment 1 could potentially comprise millions of clients 12 and thousands of LDAP servers 16 and DA systems 18.

The computer communications network 10 can be any non-publically accessible network such as a LAN (local area network) or WAN (wide area network), or preferably, the Internet. The interconnections between the LDAP servers 16, DA systems 18 and clients 12 can be thought of as virtual circuits that are established between the LDAP servers 16, DA systems 18 and the clients 12 for the express purpose of communication. In operation, clients 12 can establish a connection with an LDAP server 16 in order to transmit a request for data stored in the DA system 18 via the computer communications network 10. Typically, the data can be telecommunications related data, for instance a directory listing.

As shown in FIG. 1, each server 14 preferably comprises a computer having therein a central processing unit (CPU) 26, an internal memory device 24 such as a random access memory (RAM), and a fixed storage 22 such as a hard disk drive (HDD). The server 14 also includes network interface circuitry (NIC) 28 for communicatively connecting the server 14 to the computer communications network 10. Optionally, the server 14 can further include a keyboard (not shown) and at least one user interface display unit (not shown) such as a video display terminal (VDT) operatively connected thereto for the purpose of interacting with the server 14. However, the invention is not limited in this regard. Rather, the server 14 requires neither a keyboard nor a VDT to operate according to the inventive arrangements.

The CPU 26 can comprise any suitable microprocessor or other electronic processing unit, as is well known to those skilled in the art. Examples of a suitable CPU can include an Intel Pentium® class processor, an IBM PowerPC® class processor or an AMD Athlon® class processor. The fixed storage 22 can store therein an operating system, for example IBM AIX® (not shown). Additionally, where the server 14 hosts an LDAP server application, the fixed storage 22 can store therein an LDAP server application 16 that can process LDAP requests for directory information. In contrast, where the server 14 hosts a DA system, the DA system application 18 can similarly reside in the fixed storage 22. Moreover, in the preferred embodiment, the directory information database 30 can be stored in a database in the fixed storage 22, however the invention is not limited in this regard. Rather, the database can be a distributed database stored in fixed storage elsewhere in the computer communications network 10. Additionally, the invention is not limited with regard to the separation of the LDAP server application 16 from the DA system application 18. Rather, both can reside in the same fixed storage 22 and execute in the same server 14.

In a server computer 14 hosting an LDAP server 16, the fixed storage 26 can further store therein an LDAP plug-in 20 to the LDAP server 16. The LDAP plug-in 20 can contain a function for communicatively linking an LDAP interface to a DA system. In the preferred embodiment, the plug-in function can be implemented by a programmer of ordinary skill in the art by employing well-known LDAP programming methods using third-generation language technology, for example ANSI C. Those methods can be implemented and incorporated into the plug-in function using commercially available development tools for the operating systems described above. However, the invention is not so limited by the programming language technology used to implement the plug-in.

Figure 2:
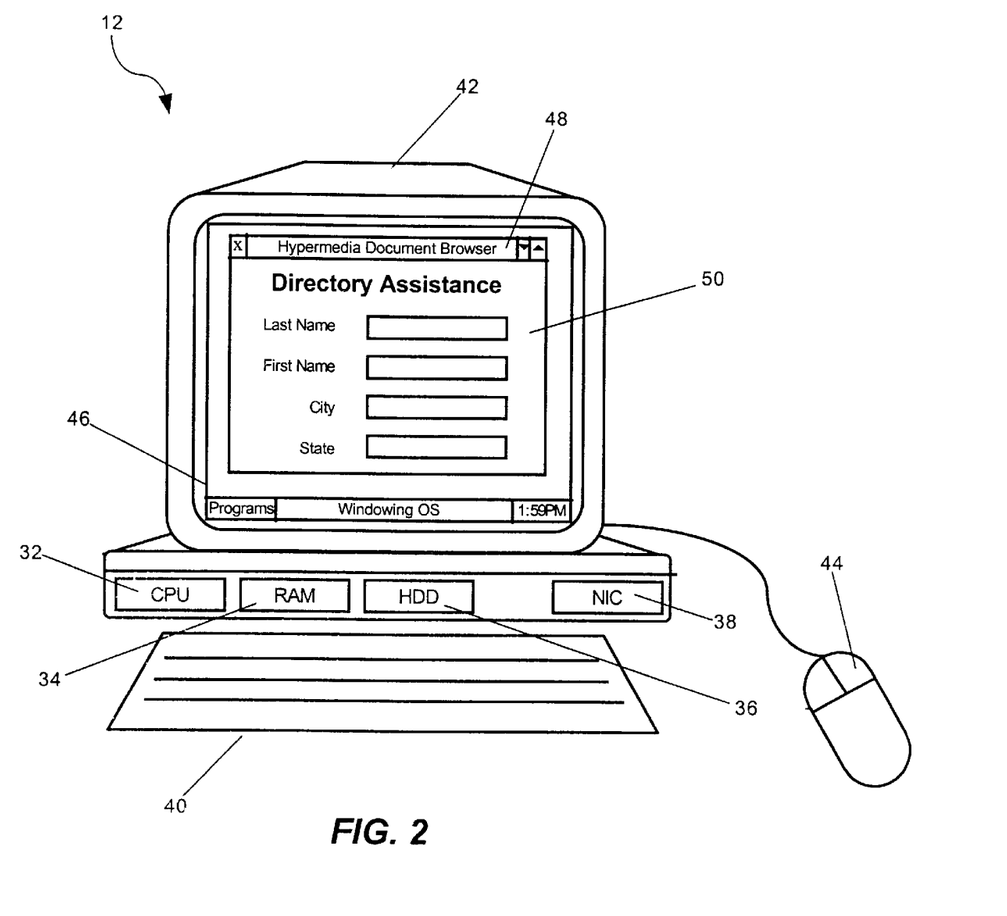
FIG. 2 is a pictorial representation of a client computer suitable for hosting an LDAP client.

Turning now to FIG. 2, similar to the server 14, clients 12 also preferably comprise a computer having a CPU 32, an internal memory device 34, fixed storage 36, and network interface circuitry 38, substantially as described above. In the preferred embodiment, the client 12 is a personal computer. Hence, the client 12 can further include a keyboard 40 and at least one user interface display unit 42, such as a video display terminal (VDT) operatively connected thereto for the purpose of interacting with the client 12. Additionally, the client 12 can further include a pointing device 44. As in the case of the server 14, the CPU 32 can comprise any suitable microprocessor or other electronic processing unit, as is well known to those skilled in the art. Examples of a suitable CPU can include an Intel Pentium class processor, an IBM PowerPC class processor or an AMD Athlon class processor.

The fixed storage 36 can store therein each of an operating system 46 and a hypermedia document browser application 48 for displaying hypermedia documents 50, for example Web pages. Preferably, both the operating system 46 and the hypermedia document browser application 48 can be loaded into the internal memory device 34 upon initialization. The hypermedia document browser application 48 preferably permits the client 12 to send and receive requests for hypermedia documents 50 to and from Web servers communicatively connected to the computer communications network 10. Additionally, preferably the hypermedia document browser can support the LDAP protocol as an LDAP client. As such, preferably the hypermedia document browser 48 can transmit LDAP requests for directory information to the servers 14 via the computer communications network 10. In the preferred embodiment, the hypermedia document browser application 48 can be an LDAP-enabled Web browser, for example Netscape Communicator® or Microsoft Internet Explorer®.

Although the foregoing describes a preferred implementation of the invention for a DA System manufactured by International Business Machines Corporation, having a proprietary database referred to as the "Listing Services Inquiry Program for AIX" (LSIP) the invention is not limited to the IBM DA System or the LSIP Inquiry Database. Rather, the IBM DA System is illustrated merely as an example of a proprietary DA system for use in the present invention.

In the IBM DA system, the DA system database 30 is an LSIP Inquiry Data base containing a hierarchical view of a customer's localities using LSIP locality ID sets. Notably, the LSIP Inquiry Database is a flat database. In consequence of the use of the flat LSIP Inquiry Database, in converting the LDAP request to an LSIP compatible request, the LDAP plug-in 20 provides an abstraction of one completely different data schema to another. In particular, in the present invention, the LDAP white pages schema incorporating a locality-based tree is abstracted both to and from the proprietary, flat LSIP Inquiry Database. However, the plug-in 20 abstraction layer still can provide the appearance of a virtual LDAP tree to the LDAP server on both query input and output results.

To perform this abstraction, plug-in 20 can map an incoming LDAP compatible search argument contained in an LDAP request to the proprietary LSIP format. In the preferred embodiment, the LDAP compatible search argument can be, for example, a locality-based DN. By comparison, an LSIP request combines an NPA (area code), Book (referring to a hard copy phone book) and Loc ID (specific locality for the LSIP search. Thus, as an example, given an input search base of: "l=Boca Raton, l=Highland Beach Directory, st=FL, . . . ,c=us" the plug-in 20 can convert this locality-based DN to an LSIP request based on NPA, Book and Loc ID in order to perform a listing search. The plug-in 20 can derive the NPA, Book and Loc ID by constructing from the input DN, search arguments for querying an LSIP Locality Resolution Database. An LSIP Locality Resolution Database can include a "Caption Set Level" field, a "Search/Display Name" filed, an "Alternate Finding Name" field and a "Locality ID Set" field. The search query of the Locality Resolution Database can return an NPA, Book and Loc which are used to perform a normal LSIP listing query.

Figure 3:
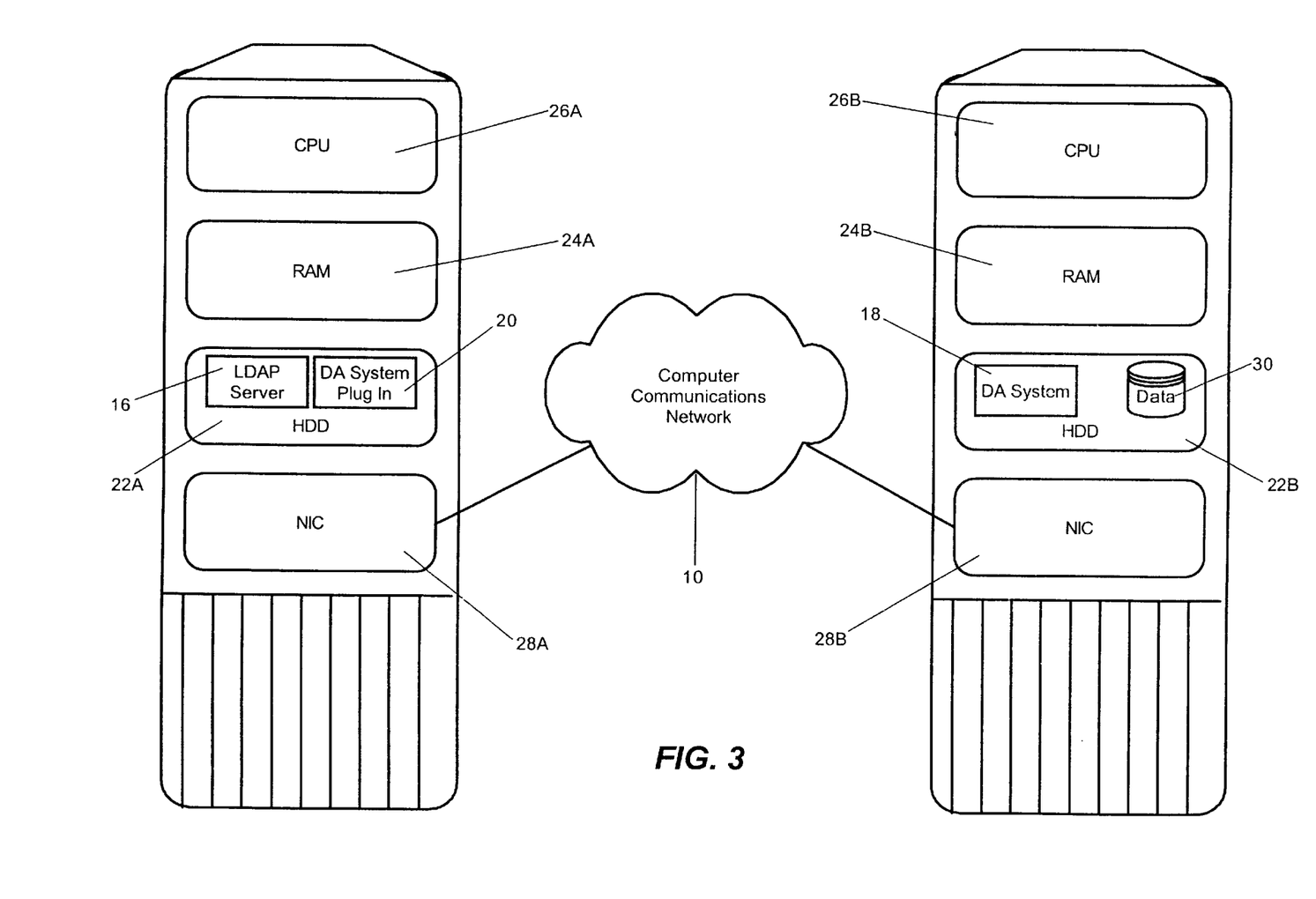
FIG. 3 is a pictorial representation of a server computer suitable for hosting an LDAP server linked by the computer communications network of FIG. 1 to a server computer suitable for hosting a DA system.

Turning now to FIG. 3, in operation, the LDAP server application 16 can accept LDAP requests from clients 12 in order to service transmitted requests for data stored in the DA system database 30. Specifically, LDAP requests can be received via the computer communications network 10 in the network interface circuitry 28A. The network interface circuitry 28A can pass the LDAP requests to the operating system (not shown) which in turn can pass the LDAP requests to the LDAP server application 16 stored in fixed storage 22A and executing in memory 24A. Subsequently, the LDAP plug-in 20 can intercept the request and convert the same to a query recognizable by the DA system application 18.

The plug-in 20 can transmit the DA system compatible request to the DA system application 18. Specifically, the plug-in 20 can pass the request using the TCP/IP communications protocol to the operating system (not shown) which in turn can transmit the request through the network interface circuitry 28A to the computer communications network 10. The DA system compatible requests can be received via the computer communications network 10 in the network interface circuitry 28B. The network interface circuitry 28B can pass the LDAP requests to the operating system (not shown) which in turn can pass the LDAP requests to the DA system application 18 stored in fixed storage 22B and executing in memory 24B.

Subsequently, the DA system application 18 can perform a search of the database 30 according to the query and can return the result set to the LDAP server application 16 through the plug-in 20. Specifically, the DA system application 18 can pass the result set using the TCP/IP communications protocol to the operating system (not shown) which in turn can transmit the request through the network interface circuitry 28B to the computer communications network 10. The result set can be received via the computer communications network 10 in the network interface circuitry 28A. The network interface circuitry 28A can pass the result set to the operating system (not shown) which in turn can pass the result set to the plug-in 20. The plug-in 20 in turn can covert the DA system compatible result set to a format compatible with LDAP and can pass the same to the LDAP server application 16. The LDAP server application 16 subsequently can transmit the result set to the requesting LDAP client residing and executing in client 12.

Upon converting the LDAP request, the plug-in 20 can transmit the converted DA system compatible request, for example an LSIP request, to the DA system 18. Specifically, the plug-in 20 can pass the request using the TCP/IP communications protocol to the operating system (not shown) which in turn can transmit the request through the network interface circuitry 28A to the computer communications network 10. The DA system compatible requests can be received in the DA system 18 via the computer communications network 10 and through the network interface circuitry 28B. More particularly, the network interface circuitry 28B can receive the data packets comprising the DA system compatible requests and can pass the DA system compatible requests to the DA system application 18 stored in fixed storage 22B and executing in memory 24B.

Subsequently, the DA system 18 can perform a search of the database 30 according the DA system compatible request. Once the listings are obtained from the database 30, a result set can be generated. For example, in the case of the IBM DA system, once the listings are obtained from the LSIP Inquiry Database, each NPA, Book and Loc corresponding to a matching listing and contained in each matching listing record can be returned as a result set. The DA system 18 can transmit the result set using the TCP/IP communications protocol to the operating system (not shown) which in turn can transmit the request through the network interface circuitry 28B to the computer communications network 10. The result set can be received via the computer communications network 10 in the network interface circuitry 28A. The network interface circuitry 28A can pass the result set to the operating system (not shown) which in turn can pass the result set to the plug-in 20. Significantly, the plug-in 20 in turn can convert the DA system compatible result set to a format compatible with LDAP and can pass the same to the LDAP server application 16. That is, the result set can be converted back into a DN for the LSIP-based listings in order to indicate a relative location of the result set in the virtual LSAP tree. The LDAP server application 16 subsequently can transmit the result set to the requesting LDAP client residing and executing in client 12.

Figure 4:
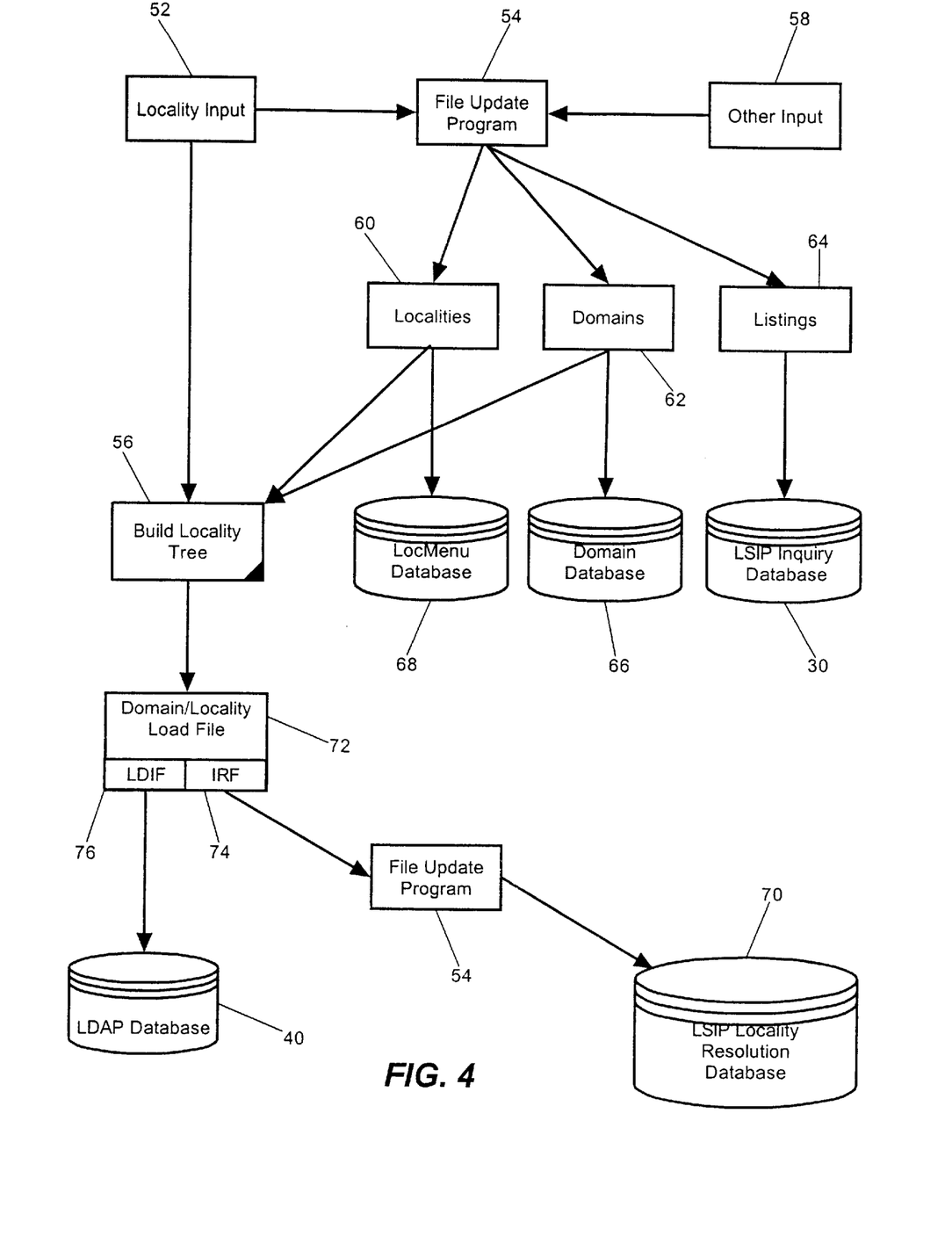
FIG. 4 is a schematic representation of a system for adding localities to a DA system with support for the LDAP interface of the inventive arrangements.

FIG. 4 illustrates a preferred method of implementing an LDAP interface to a DA system. In present DA systems, to properly represent the localities of customer data, a geographical representation can be defined to include all localities containing a customer's listings. This process can be performed by a File Update Program (FUP) process 54. In the present invention, an additional step can be added to the FUP process 54 of loading the customer's data. Specifically, the additional step can support both the generation of LDAP locality based organization of directory information and LSIP locality based organization of directory information. To map one to the other, the Locality Resolution Database 70 further must be generated.

In particular, upon receiving a locality input 52, and potentially other input 58, the FUP process 54 can update the localities 60, domains 62 and listings 64 in the LocMenu Database 68, Domain Database 66 and LSIP Inquiry Database 30, respectively. In addition, a Locality Processor 56 can utilize the existing locality and domain information 60, 62 stored in the existing databases 66, 68 in order to build load files for both LSIP and LDAP. Preferably, all of the localities of the customer are fed into the Locality Processor 56 which can produce a Domain/Locality Load File 72 capable of handling in parallel Intermediate Record Format (IRF) 76 and LDAP Directory Information Format (LDIF) 74.

Notably, LDIF 74 preferably is used only if the customer has enhanced listings that will reside in an actual "true" LDAP directory database 40, as opposed to the LSIP database 30. LDIF 74 can contain a locality-based hierarchy from the top-down to the listing entries. Thus, in the case where a node or distinguished name (DN) in the directory includes: "cn=John Doe, l=Boca Raton, l=Boca Raton Window, l=Highland Beach Directory, st=FL, . . . , c=us", a corresponding LDIF representation could comprise:

Because the listing entries depend on this locality hierarchy in their distinguished names, an LDIF file of localities for the customer site preferably is loaded as a prerequisite to the loading of the actual listing records.

Likewise, the IRF can represent a hierarchy of localities indexed in the LSIP Locality Resolution Database 70. For example, the IRF can represent the following hierarchy of localities stored in the Locality Resolution Database 70 as follows:

| Caption Set Level (0–7) | Search/Display Name | Alternative Finding Name | Locality ID Set |
|---|---|---|---|
| 0 | US | XXL0US | 111.128.1 |
| 1 | FL | XXL1FL | 516.128.0 |
| 2 | Highland Beach Directory | XXL2HIGHLANDBEACHDIRECTORY | 516.128.3 |
| 3 | Boca Raton | XXL3BOCARATON | 516.2.3 |

In sum, in the preferred embodiment of the present invention, the localities of the customer site preferably are represented in two formats (1) IRF for the LSIP Inquiry Database 70 load, and (2) LDIF for the LDAP Database 40 load if the customer has enhanced listings that will not reside in the LSIP Inquiry Database 70.

What is claimed is:

1. A method for mapping a Lightweight Directory Access Protocol (LDAP) interface to a Directory Assistance (DA) system comprising the steps of:
   (a) extracting from an LDAP request LDAP-compatible arguments for searching an LDAP database;
   (b) converting the LDAP-compatible arguments to search arguments compatible with a DA system database;
   (c) querying said DA system database with said converted search arguments;
   (d) receiving a result set of listings from said DA system database in response to said query; and,
   (e) converting said result set to a result set compatible with LDAP.

2. The method according to claim 1, further comprising the step of: receiving said LDAP request from an LDAP client.

3. The method according to claim 1, further comprising the step of: receiving said LDAP request in an LDAP server.

4. The method according to claim 1, wherein said LDAP request contains an LDAP filtered attribute.

5. The method according to claim 4, wherein said step of converting comprises the step of:
   mapping search arguments in said filtered attribute to search arguments compatible with said DA system database.

6. The method according to claim 5, wherein said step of mapping comprises the steps of:
   consulting a locality resolution database, each record in said locality resolution database mapping a locality to a Locality ID Set;
   identifying in said locality resolution a database record corresponding to said search arguments; and,
   forming a DA system database query statement with a Locality ID Set contained in said identified record.

7. The method according to claim 6, wherein said Locality ID Set comprises at least one of an area code, book and location.

8. The method according to claim 3, wherein each of steps (a)–(e) are performed in a plug-in to said LDAP server.

9. A machine readable storage, having stored thereon a computer program having a plurality of code sections for mapping a Lightweight Directory Access Protocol (LDAP) interface to a Directory Assistance (DA) system, said code sections executable by a machine for causing the machine to perform the steps of:
   (a) extracting from an LDAP request LDAP compatible search arguments for searching an LDAP database,
   (b) converting the LDAP compatible search arguments to search arguments compatible with a DA system database;
   (c) querying said DA system database with said converted search arguments,
   (d) receiving a result set of listings from said DA system database in response to said query; and,
   (e) converting said result set to a result set compatible with LDAP.

10. The machine readable storage according to claim 9, for further causing the machine to perform the step of:
    receiving said LDAP request from an LDAP client.

11. The machine readable storage according to claim 9, for further causing the machine to perform the step of:
    receiving said LDAP request in an LDAP server.

12. The machine readable storage according to claim 9, wherein said LDAP request is an LDAP distinguished name.

13. The machine readable storage according to claim 12, wherein said step of converting comprises the step of:
    mapping search arguments in said distinguished name to search arguments compatible with said DA system database.

14. The machine readable storage according to claim 13, wherein said step of mapping comprises the steps of:
    consulting a locality resolution database, each record in said locality resolution database mapping a locality to a Locality ID Set;
    identifying in said locality resolution a database record corresponding to said search arguments; and,
    forming a DA system database query statement with a Locality ID Set contained in said identified record.

15. The machine readable storage according to claim 14, wherein said Locality ID Set comprises at least one of an area code, book and location.

* * * * *